(12) United States Patent
Oguro et al.

(10) Patent No.: US 11,745,600 B2
(45) Date of Patent: Sep. 5, 2023

(54) DRIVING FORCE CONTROLLER FOR VEHICLE

(71) Applicant: SUBARU CORPORATION, Tokyo (JP)

(72) Inventors: Chihiro Oguro, Tokyo (JP); Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 271 days.

(21) Appl. No.: 17/126,667

(22) Filed: Dec. 18, 2020

(65) Prior Publication Data

US 2021/0237586 A1 Aug. 5, 2021

(30) Foreign Application Priority Data

Feb. 4, 2020 (JP) .................................. 2020-016684
Nov. 27, 2020 (JP) .................................. 2020-196775

(51) Int. Cl.
  *B60L 15/20* (2006.01)
  *B60W 30/188* (2012.01)
  (Continued)

(52) U.S. Cl.
  CPC ............. *B60L 15/2009* (2013.01); *B60L 7/10* (2013.01); *B60W 30/188* (2013.01);
  (Continued)

(58) Field of Classification Search
  CPC ................. B60L 15/20; B60L 15/2009; B60L 2240/423; B60L 2260/26; B60L 2260/30;
  (Continued)

(56) References Cited

U.S. PATENT DOCUMENTS 6,574,535 B1 * 6/2003 Morris ..................... B60K 6/44
  180/65.6
7,171,299 B1 * 1/2007 Stroh .................. F02D 41/1497
  701/111
(Continued)

FOREIGN PATENT DOCUMENTS

CN          107117069 A  *  9/2017  ............. B60L 15/20
JP      JP 2015-104295 A      6/2015

OTHER PUBLICATIONS

EPO machine translation of CN 107117069 A—with appended abstract and drawing sheet annotated by examiner (original CN document published Sep. 1, 2017) (Year: 2017).*

*Primary Examiner* — David A Testardi
(74) *Attorney, Agent, or Firm* — McGinn I.P. Law Group, PLLC

(57) ABSTRACT

A driving force controller for vehicle includes a driving force calculator and a driving controller. The driving force calculator calculates an instructed driving force, and includes a first determination unit that determines whether or not a predicted driving force satisfies a first condition. The predicted driving force assumes that the instructed driving force calculated on a first control cycle is changed at a rate of change calculated on the first control cycle, until a second control cycle. The first condition includes that a range between the instructed driving force calculated on the first control cycle and the predicted driving force at least partly cover a first range including a zero driving force. The driving force calculator imposes limitation on the rate of change in the instructed driving force to be calculated in the second control cycle, on the condition that the first condition is satisfied.

20 Claims, 6 Drawing Sheets

(51) Int. Cl.
  *B60L 7/10* (2006.01)
  *B60W 30/20* (2006.01)

(52) U.S. Cl.
  CPC .......... *B60W 30/20* (2013.01); *B60L 2240/12* (2013.01); *B60L 2240/421* (2013.01); *B60L 2240/429* (2013.01)

(58) Field of Classification Search
  CPC .......... B60W 50/10; B60W 2710/083; B60W 2710/085; B60W 30/188; B60W 30/20
  See application file for complete search history.

(56) References Cited

U.S. PATENT DOCUMENTS

| | | | | |
|---|---|---|---|---|
| 9,340,199 | B1* | 5/2016 | Nefcy | B60W 20/00 |
| 2003/0158648 | A1* | 8/2003 | Kubota | B60K 31/0008 |
| | | | | 123/352 |
| 2009/0033264 | A1* | 2/2009 | Falkenstein | F02D 11/105 |
| | | | | 318/432 |
| 2009/0088919 | A1* | 4/2009 | Muta | B60K 23/0808 |
| | | | | 701/69 |
| 2010/0023194 | A1* | 1/2010 | Okubo | B60W 30/20 |
| | | | | 477/3 |
| 2010/0299009 | A1* | 11/2010 | Falkenstein | B60K 6/485 |
| | | | | 180/65.265 |
| 2012/0319634 | A1* | 12/2012 | McGrogan | B60L 58/14 |
| | | | | 318/434 |
| 2013/0035838 | A1* | 2/2013 | Maier | B60K 6/48 |
| | | | | 701/99 |
| 2013/0296106 | A1* | 11/2013 | Dai | B60W 10/02 |
| | | | | 903/902 |
| 2013/0297111 | A1* | 11/2013 | Yamazaki | B60W 20/00 |
| | | | | 180/65.265 |
| 2015/0158493 | A1* | 6/2015 | Nakatsu | B60W 10/22 |
| | | | | 701/22 |
| 2017/0036669 | A1* | 2/2017 | Kanou | B60K 6/445 |
| 2017/0259670 | A1* | 9/2017 | Kuang | B60L 15/2009 |
| 2017/0267247 | A1* | 9/2017 | Umayahara | B60L 58/40 |
| 2017/0327102 | A1* | 11/2017 | Yamazaki | F02D 41/107 |
| 2018/0118194 | A1* | 5/2018 | Kuang | B60K 6/387 |
| 2018/0170386 | A1* | 6/2018 | Jung | B60L 7/18 |
| 2018/0202545 | A1* | 7/2018 | Zhao | B60W 30/18127 |
| 2020/0130673 | A1* | 4/2020 | Suzuki | B60W 30/188 |
| 2020/0339081 | A1* | 10/2020 | Suzuki | B60W 30/18127 |
| 2021/0162869 | A1* | 6/2021 | Nakamura | B60W 30/18127 |
| 2021/0188278 | A1* | 6/2021 | Oguro | B60W 10/04 |
| 2021/0213950 | A1* | 7/2021 | Books | B60T 1/062 |
| 2022/0072961 | A1* | 3/2022 | Bolger | B60L 15/2009 |
| 2022/0097700 | A1* | 3/2022 | Semenov | B60W 50/085 |
| 2022/0379732 | A1* | 12/2022 | Nakamura | B60L 15/2018 |

* cited by examiner

DRIVING FORCE CONTROLLER FOR VEHICLE

CROSS-REFERENCE TO RELATED APPLICATIONS

This application claims priority from Japanese Patent Application Nos. 2020-196775 filed on Nov. 27, 2020, and 2020-016684 filed on Feb. 4, 2020, the entire contents of which are hereby incorporated by reference.

BACKGROUND

The disclosure relates to a driving force controller for vehicle including a driving force calculator that calculates an instructed driving force.

Vehicles such as an EV (Electric Vehicle) and an HEV (Hybrid Electric Vehicle) include an electric motor as a power source. In such vehicles, switching of the electric motor from powering operation to regenerative operation may sometimes cause an impact in the power source or on a transmission path of motive power. In an engine vehicle as well, on the occasion that a driving force of an engine as a power source changes crossing over zero, an impact may sometimes occur in the power source or on a transmission path of motive power.

For example, Japanese Unexamined Patent Application Publication (JP-A) No. 2015-104295 discloses a method of suppressing an impact on the occasion of switching of a motor in an EV from a powering control to a regenerative control.

SUMMARY

An aspect of the technology provides a driving force controller for vehicle. The vehicle includes a driving wheel and a power source configured to output a driving force to the driving wheel. The driving force controller for vehicle includes a driving force calculator and a driving controller. The driving force calculator is configured to calculate an instructed driving force that varies on the basis of a driving command. The driving controller is configured to allow the power source to output, as the driving force, the instructed driving force calculated by the driving force calculator. The driving force calculator includes a first determination unit configured to determine whether or not a predicted driving force satisfies a first condition. The predicted driving force assumes that the instructed driving force calculated on a first control cycle is changed at a rate of change in the instructed driving force calculated on the first control cycle, until a second control cycle following the first control cycle. The first condition includes that a range between the instructed driving force calculated on the first control cycle and the predicted driving force at least partly cover a first range. The first range includes a zero driving force at which the driving force is zero. The driving force calculator is configured to impose limitation on the rate of change in the instructed driving force to be calculated on the second control cycle, on the condition that the first determination unit determines that the first condition is satisfied.

An aspect of the technology provides a driving force controller for vehicle. The vehicle includes a driving wheel and a power source configured to output a driving force to the driving wheel. The driving force controller for vehicle includes circuitry. The circuitry is configured to calculate an instructed driving force that varies on the basis of a driving command. The circuitry is configured to allow the power source to output, as the driving force, the instructed driving force calculated by the circuitry. The circuitry is configured to determine whether or not a predicted driving force satisfies a first condition. The predicted driving force assumes that the instructed driving force calculated on a first control cycle is changed at a rate of change in the instructed driving force calculated on the first control cycle, until a second control cycle following the first control cycle. The first condition includes that a range between the instructed driving force calculated on the first control cycle and the predicted driving force at least partly cover a first range. The first range includes a zero driving force at which the driving force is zero. The circuitry is configured to impose limitation on the rate of change in the instructed driving force to be calculated on the second control cycle, on the condition that the circuitry determines that the first condition is satisfied.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
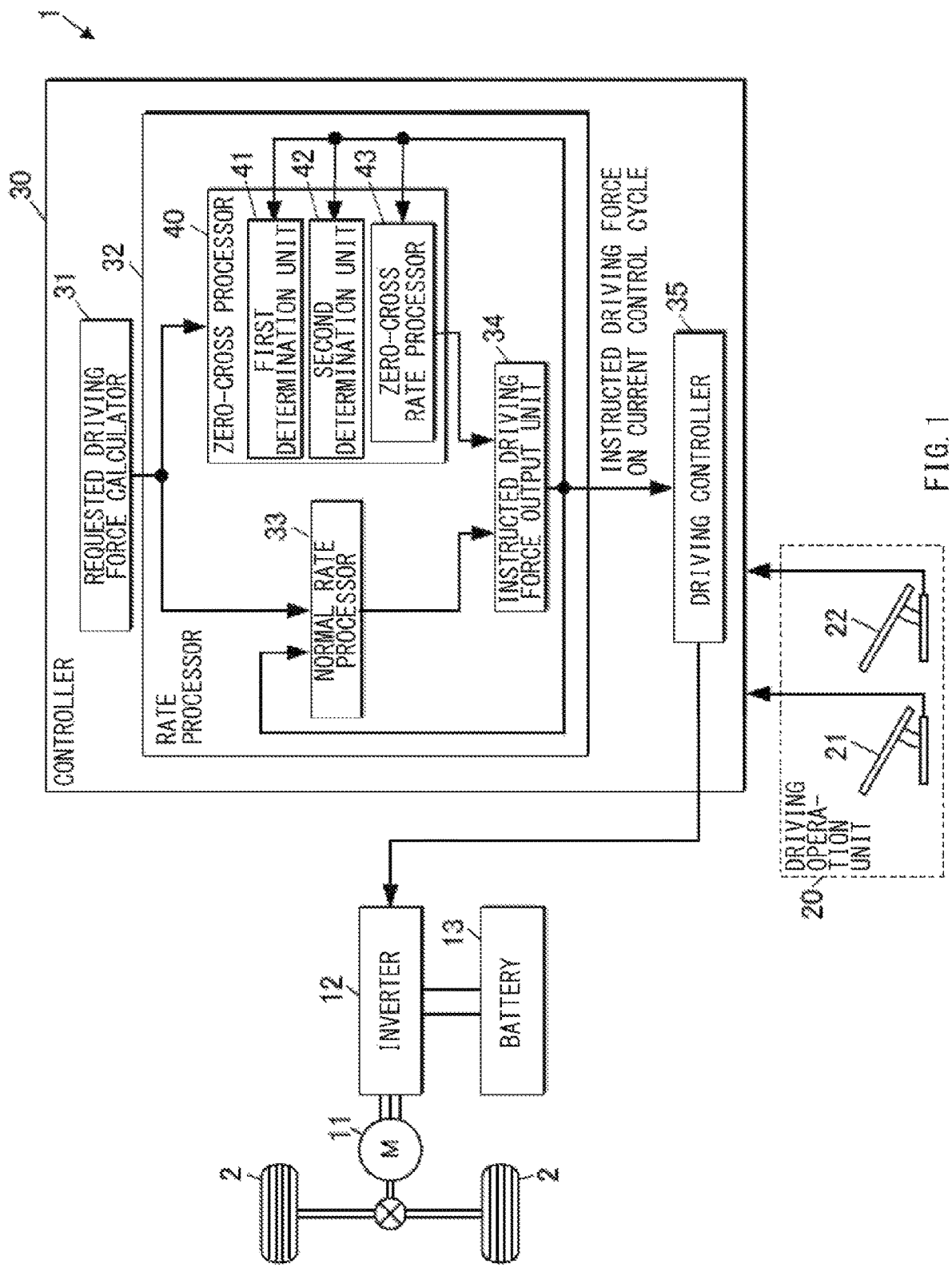
FIG. 1 is a block diagram of a vehicle according to an embodiment of the disclosure.

On the occasion that a driving force changes crossing over zero, an impact may occur in a power source or on a transmission path of motive power. Suppressing such an impact by a driving force control may involve detecting control timing appropriately. However, a high rate of change in the driving force may contribute to a failure in detecting the control timing to suppress the impact. A rate of change means an amount of change per unit time.

It is desirable to provide a driving force controller for vehicle that makes it possible to reduce failures in detecting control timing to suppress an impact even in a case with a high rate of change in a driving force to be outputted from a power source, and appropriately suppress an impact while the driving force changes crossing over zero.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

FIG. 1 is a block diagram of a vehicle according to an embodiment of the disclosure. The vehicle 1 in this embodiment may be, for example, an EV, and include driving wheels 2 and a traveling motor 11, an inverter 12, a battery 13, a driving operation unit 20, and a controller 30. The traveling motor 11 may output motive power to the driving wheels 2. The inverter 12 may drive the traveling motor 11. The battery 13 may supply electric power to drive the traveling motor 11. The driving operation unit 20 may include an accelerator pedal 21 and a brake pedal 22. The controller 30 may be supplied with an operation signal from the driving operation unit 20, and carry out a driving control of the inverter 12. In one embodiment of the disclosure, the controller 30 may serve as a "driving force controller for vehicle". In one embodiment of the disclosure, the traveling motor 11 may serve as an "electric motor".

The controller 30 may include a single ECU (Electronic Control Unit), or alternatively, the controller 30 may have a configuration in which a plurality of ECUs communicates with one another to operate in cooperation with one another. The controller 30 may include a ROM (Read Only Memory) and a CPU (Central Processing Unit). The ROM may hold control programs. The CPU may perform calculation processing. The CPU may execute the control programs, to provide a plurality of modules. The plurality of the modules may include a requested driving force calculator 31, a rate processor 32, and a driving controller 35. The requested driving force calculator 31 may calculate a requested driving force on the basis of the operation signal from the driving operation unit 20. The rate processor 32 may calculate, from the requested driving force, an instructed driving force with a rate of change in the driving force being limited. The driving controller 35 may make the driving control of the inverter 12, to allow the instructed driving force calculated by the rate processor 32 to be outputted from the traveling motor 11. In one embodiment of the disclosure, the requested driving force calculator 31 and the rate processor 32 may serve as a "driving force calculator".

The requested driving force calculator 31 may calculate the requested driving force in accordance with a driving command. The driving command may include an amount of operation of the accelerator pedal 21 or the brake pedal 22 to be inputted by a driver. The requested driving force changes steeply in a case where the accelerator pedal 21 or the brake pedal 22 is operated abruptly.

The rate processor 32 may include a normal rate processor 33, a zero-cross processor 40, and an instructed driving force output unit 34. The normal rate processor 33 may carry out rate-of-change limitation for alleviation of an abrupt change in the requested driving force, to calculate the instructed driving force following the requested driving force. The zero-cross processor 40 may carry out rate-of-change limitation for alleviation of an impact on the occasion that the driving force changes crossing over zero, to calculate the instructed driving force following the requested driving force. In the following, the driving force being zero is referred to as a "zero driving force". The instructed driving force output unit 34 may output, to the driving controller 35, either one of the instructed driving forces calculated by the normal rate processor 33 and the zero-cross processor 40.

The requested driving force calculator 31 and the rate processor 32 may calculate a single value of the instructed driving force on each control cycle, e.g., 10 ms (milliseconds), and output the instructed driving force thus calculated to the driving controller 35. Since the instructed driving force is calculated to follow the requested driving force based on the driving command, the instructed driving force is an amount that changes on the basis of the driving command.

The zero-cross processor 40 may include a first determination unit 41, a second determination unit 42, and a zero-cross rate processor 43. The first determination unit 41 and the second determination unit 42 may detect predetermined control timing. The zero-cross rate processor 43 may calculate the instructed driving force in accompaniment with a rate-of-change limitation control.

The second determination unit 42 may determine whether or not the instructed driving force on a current control cycle satisfies a zero-cross condition. The zero-cross condition is a condition indicating that the instructed driving force is close to zero. In one example, in a case where the instructed driving force is included in a near-zero range W1 (refer to FIG. 4), the second determination unit 42 may determine that the zero-cross condition is satisfied. In one embodiment of the disclosure, the near-zero range W1 may serve as a "first range". The near-zero range W1 may be, for example, a range from −100 N to 100 N both inclusive.

The first determination unit 41 may calculate a predicted driving force on a next control cycle that is predicted from the instructed driving force on the current control cycle and its rate of change. The first determination unit 41 may determine whether or not the predicted driving force satisfies a first condition. The first condition includes a condition that a range between the instructed driving force on the current control cycle and the predicted driving force at least partly cover the near-zero range W1 (refer to FIG. 4). Moreover, the first condition may include a condition that the predicted driving force overshoots the near-zero range W1 as viewed in a time-series order from the instructed driving force on the current control cycle to the predicted driving force on the next control cycle. The predicted driving force overshooting the near-zero range W1 means that the instructed driving force on the current control cycle falls beyond the near-zero range W1, i.e., is greater than a maximum W1max of the near-zero range W1, and the predicted driving force falls below the near-zero range W1, i.e., is smaller than a minimum W1min of the near-zero range W1. Alternatively, the predicted driving force falling outside the near-zero range W1 means that the instructed driving force on the current control cycle falls below the near-zero range W1, i.e., is smaller than the minimum W1min of the near-zero range W1, and the predicted driving force falls beyond the near-zero range W1, i.e., is greater than the maximum W1max of the near-zero range W1.

The first determination unit 41 may store the instructed driving force on a previous control cycle, and calculate a difference between the instructed driving force on the previous control cycle and the instructed driving force on the current control cycle, to calculate a rate of change in the instructed driving force on the current control cycle. The first determination unit 41 may obtain the predicted driving force by adding, to the rate of change in the instructed driving force on the current driving force, a value obtained by multiplying the rate of change in the instructed driving force on the current control cycle by a time length of a single control cycle.

The zero-cross rate processor 43 may change a rate-of-change control parameter of the instructed driving force to a second value, and calculate the instructed driving force on the next control cycle, in a case where the second determination unit 42 determines that the zero-cross condition is satisfied. The rate-of-change limitation control may be provided by, for example, a method of limiting a slope of the instructed driving force to the rate-of-change control parameter or smaller. The slope of the instructed driving force is a slope of a graph having time on a horizontal axis and the instructed driving force on a vertical axis. Alternatively, the rate-of-change limitation control may be provided by, for example, a method of changing a time constant of a first-order delay filter to the rate-of-change control parameter in a case where the instructed driving force is calculated by filtering the requested driving force through the first-order delay filter.

The normal rate processor 33 may calculate, from the requested driving force, the instructed driving force having the rate of change being limited, with the use of the rate-of-change control parameter set at a normal value.

The limitation on the rate of change in the instructed driving force may be stronger in the case with the rate-of-change control parameter taking the second value, than in the case with the rate-of-change control parameter taking the normal value. The limitation on the rate of change being strong means that the rate of change is lowered in a case where the rate of change is high enough to necessitate the limitation. The second value may cause the rate of change in the instructed driving force to be limited to a predetermined value or lower. The predetermined value is a value at which the impact on the occasion that the driving force changes crossing over zero is suppressed.

Moreover, in the case where the first determination unit 41 determines that the first condition is satisfied, the zero-cross rate processor 43 may limit the rate of change to keep the instructed driving force on the next control cycle within the near-zero range W1, and calculate the instructed driving force on the next control cycle. The rate-of-change limitation control may be provided by changing the rate-of-change control parameter to a first value.

The limitation on the rate of change in the instructed driving force may be stronger in the case with the rate-of-change control parameter taking the first value, than in the case with the rate-of-change control parameter taking the normal value. In the zero-cross rate processor 43 as well, the rate-of-change limitation control may be provided by the forgoing method of limiting the slope of the instructed driving force, or by changing the time constant of the first-order delay filter.

In a case where the first determination unit 41 or the second determination unit 42 has determined that the condition is satisfied, and the zero-cross rate processor 43 has calculated the instructed driving force, the instructed driving force output unit 34 may output the relevant instructed driving force to the driving controller 35. In a case where the first determination unit 41 or the second determination unit 42 has determined the condition is not satisfied, and the zero-cross rate processor 43 has not calculated the instructed driving force, the instructed driving force output unit 34 may output the instructed driving force calculated by the normal rate processor 33, to the driving controller 35. The instructed driving force to be outputted from the instructed driving force output unit 34 to the driving controller 35 may be also transferred to the normal rate processor 33 and the zero-cross processor 40, to calculate the instructed driving force on the next control cycle.

<Instructed Driving Force Calculation Processing>

Figure 2:
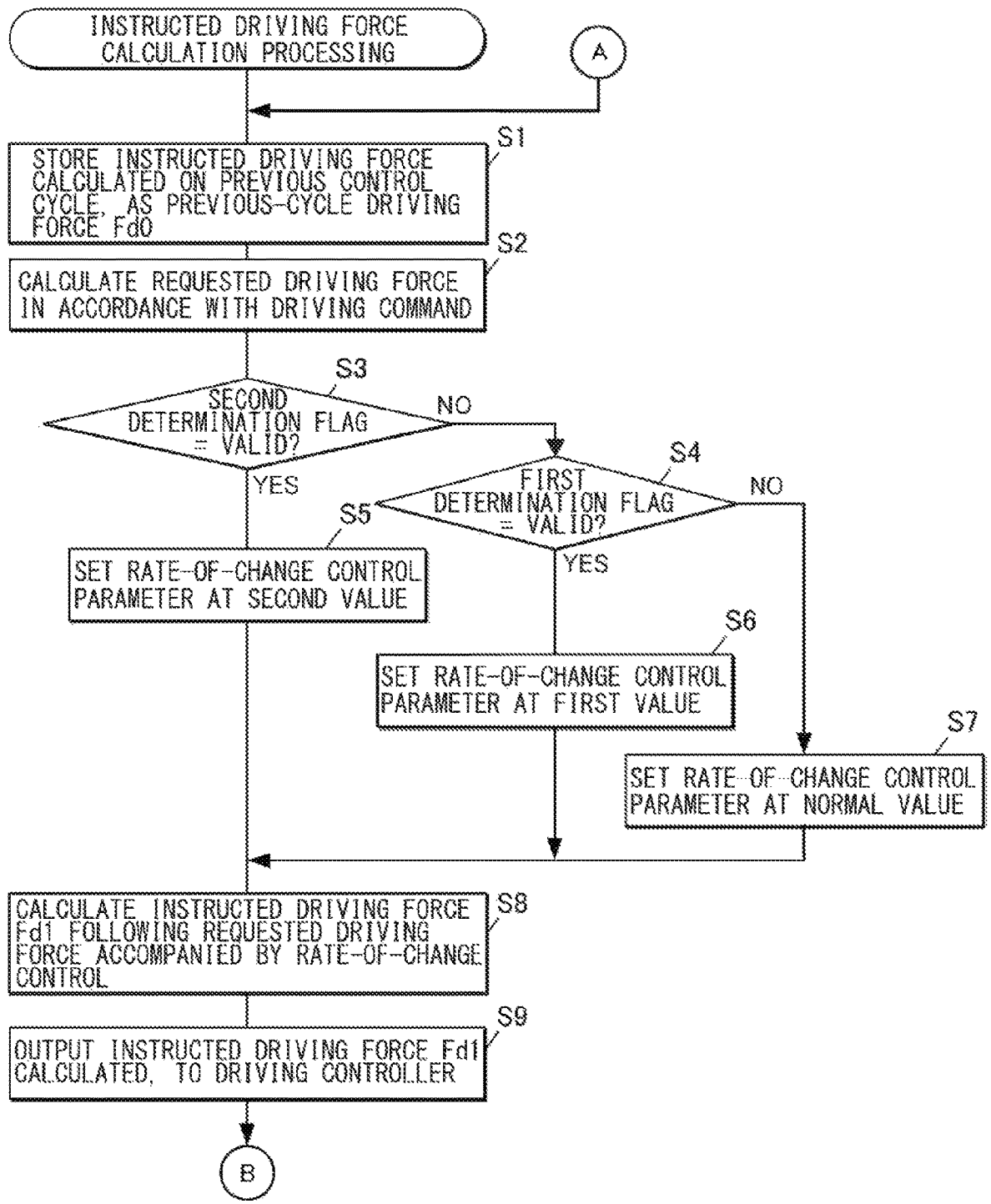
FIG. 2 is a flowchart of a portion of a procedure of calculation processing of an instructed driving force to be executed by a requested driving force calculator and a rate processor.
Figure 3:
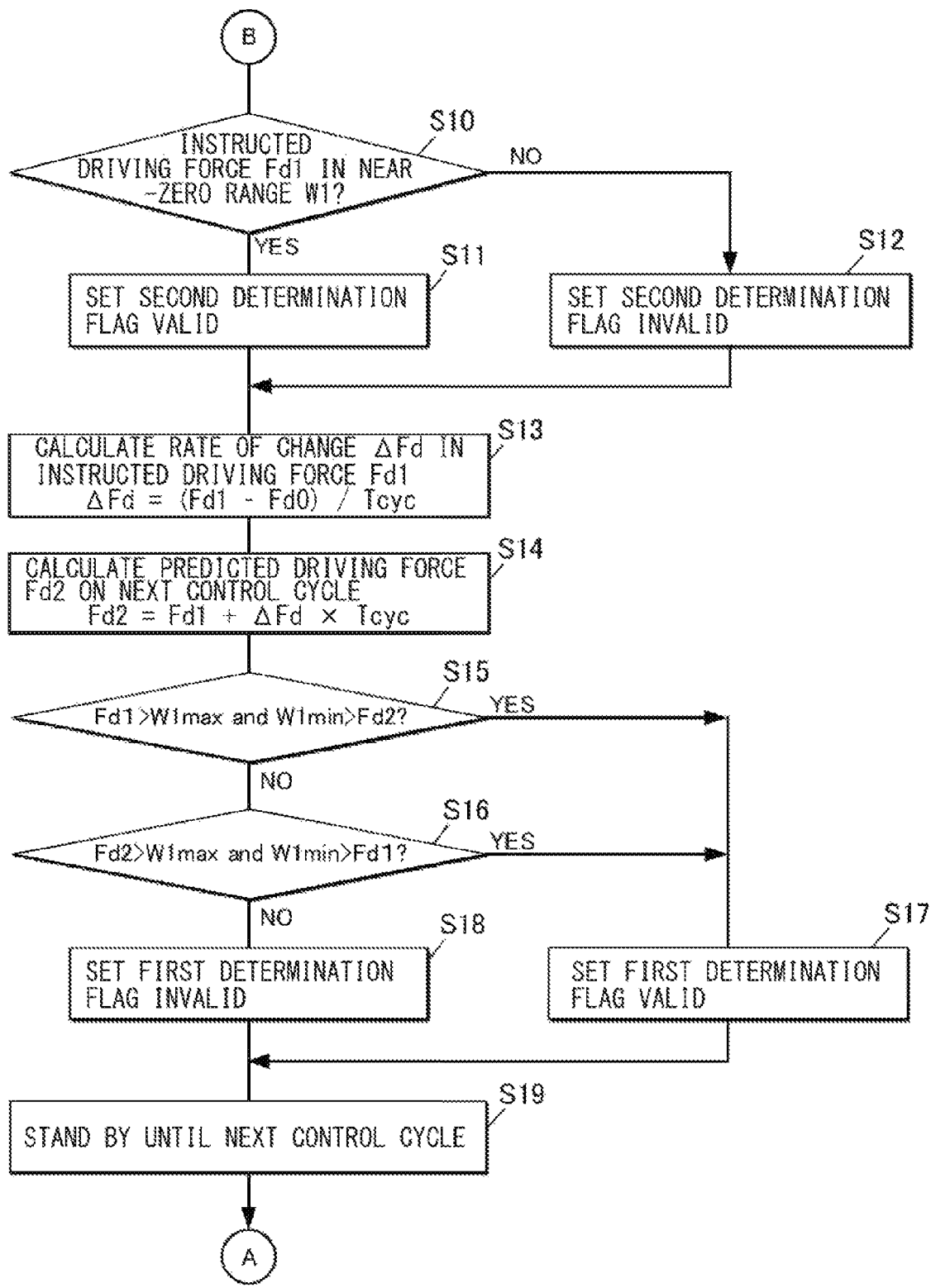
FIG. 3 is a flowchart of a portion of the procedure of the calculation processing of the instructed driving force.

Description is given next of calculation processing of the instructed driving force to be executed by the requested driving force calculator 31 and the rate processor 32. FIGS. 2 and 3 are flowcharts of a procedure of the calculation processing of the instructed driving force. The calculation processing of the instructed driving force may be processing to be executed all the time while the system of the vehicle 1 is in operation. The requested driving force calculator 31 and the rate processor 32 may repetitively execute processing of steps S1 to S19 on predetermined control cycles of, for example, 10 milliseconds (ms).

At a start of a certain control cycle (hereinafter called a "first control cycle"), first, the rate processor 32 may store the instructed driving force calculated on the previous control cycle before the first control cycle, as a previous-cycle driving force Fd0 (step S1). Thereafter, the requested driving force calculator 31 may calculate the requested driving force in accordance with the driving command (step S2). The driving command may include the amount of operation of the accelerator pedal 21 and the brake pedal 22 as the driving command by the driver. It is to be noted that the driving command is not limited to those issued by the driver but also include acceleration and deceleration commands to be issued by an automated driving system in a case where an automated driving system drives the vehicle 1.

Thereafter, the rate processor 32 may determine whether or not a second determination flag is valid (step S3). In a case where the second determination flag is invalid (No in step S3), the rate processor 32 may determine whether or not a first determination flag is valid (step S4). The first determination flag may hold a determination result by the first determination unit 41 on the previous control cycle before the first control cycle. The second determination flag may hold a determination result by the second determination unit 42 on the previous control cycle before the first control cycle.

In a case where the second determination flag is valid (Yes in step S3), the zero-cross rate processor 43 of the rate processor 32 may set the rate-of-change control parameter of the instructed driving force at the second value (step S5). Moreover, in a case where the second determination flag is invalid and the first determination flag is valid (No in step S3 and Yes in step S4), the zero-cross rate processor 43 may set the rate-of-change control parameter of the instructed driving force at the first value (step S6). Furthermore, in a case where the second determination flag and the first determination flag are invalid (No in step S3 and No in step S4), the zero-cross rate processor 43 may set the rate-of-change control parameter of the instructed driving force at the normal value (step S7).

The rate-of-change control parameter is a parameter for alleviation of an abrupt change in the instructed driving force. The first value causes the stronger limitation on the rate of change than the normal value. The second value causes the stronger limitation on the rate of change than the normal value. The limitation on the rate of change being strong means that the rate of change is lowered in the case where the rate of change is high enough to necessitate the limitation. The second value may be set at a value that limits the rate of change in the instructed driving force to an upper value or lower of the rate of change in the driving force that is able to alleviate the impact on the occasion that the actual driving force changes crossing over the zero driving force.

The first value may be set at a value that keeps the instructed driving force within the near-zero range W1. With such setting of the first value, in a case where the predicted driving force overshoots the near-zero range W1 (refer to FIG. 4), it is possible to suppress such a change in the instructed driving force. The predicted driving force is the instructed driving force to be predicted as the instructed driving force on the next control cycle (hereinafter called a "second control cycle").

The rate-of-change control parameter, as described above, may be a value that defines the upper limit of the rate of change in the instructed driving force. Alternatively, in the case where the instructed driving force is calculated by filtering the requested driving force through the first-order delay filter, the rate-of-change control parameter may be a value that defines the time constant of the first-order delay filter.

In step S5, S6, or S7, in a case where the rate-of-change control parameter is set, the rate processor 32, i.e., the normal rate processor 33 or the zero-cross rate processor 43, may perform calculation processing of the instructed driving force Fd1 accompanied with a rate-of-change control based on the rate-of-change control parameter thus set (step S8). In one example, in a case where the rate-of-change control parameter of the normal value is selected, the normal rate processor 33 may calculate the instructed driving force Fd1 using the relevant parameter. In a case where the rate-of-change control parameter of the first value or the second value is selected, the zero-cross rate processor 43 may calculate the instructed driving force Fd1 using the relevant parameter. With the calculation processing of step S8, the rate of change is limited in accordance with the rate-of-change control parameter, and the instructed driving force Fd1 on the first control cycle is calculated. The instructed driving force Fd1 follows the requested driving force calculated in step S2.

Thereafter, the normal rate processor 33 or the zero-cross rate processor 43 may send the instructed driving force Fd1 thus calculated, to the instructed driving force output unit 34. The instructed driving force output unit 34 may send the instructed driving force Fd1 to the driving controller 35 (step S9). Upon receiving the instructed driving force Fd1, the driving controller 35 may drive the inverter 12 to allow the instructed driving force Fd1 to be outputted from the traveling motor 11.

Thereafter, in the rate processor 32, the second determination unit 42 may determine whether or not the instructed driving force Fd1 on the first control cycle calculated in step S8 is included in the near-zero range W1 (see FIG. 4) (step S10). To determine the rate-of-change control parameter on the second control cycle, i.e., the next control cycle, the second determination unit 42 may set the second determination flag valid or invalid in accordance with the determination result (steps S11 and S12). The second determination flag may be used to determine the rate-of-change control parameter in steps S3 to S7 on the second control cycle.

Thereafter, in the rate processor 32, the first determination unit 41 may calculate the rate of change ΔFd in the instructed driving force Fd1 (step S13). Let us assume a case where a control of the traveling motor 11 is carried out to output, on each control cycle, after the same delay time from a starting end of each control cycle, the instructed driving force Fd1 calculated in the relevant control cycle, as the actual driving force. In this case, for example, the first determination unit 41 may calculate the rate of change ΔFd by dividing an amount of change from the previous-cycle driving force Fd0 to the instructed driving force Fd1 on the first control cycle by cycle time Tcyc of a single control cycle.

Thereafter, the first determination unit 41 may calculate the predicted driving force Fd2 on the second control cycle (step S14). The predicted driving force Fd2 may be calculated as a virtual driving force assuming that the instructed driving force Fd1 on the first control cycle is changed at the rate of change ΔFd until the second control cycle. For example, the first determination unit 41 may calculate the predicted driving force Fd2 by adding, to the instructed driving force Fd1 on the first control cycle, a value obtained by multiplying the rate of change ΔFd in the instructed driving force Fd1 on the first control cycle by the cycle time Tcyc.

Thereafter, the first determination unit 41 may determine whether or not the predicted driving force Fd2 calculated in step S14 is a value that overshoots the near-zero range W1 (steps S15 and S16). That is, the first determination unit 41 may determine whether the instructed driving force Fd1 calculated in step S14 falls beyond the near-zero range W1, i.e., is greater than the maximum W1max of the near-zero range W1, and whether the predicted driving force Fd2 falls below the near-zero range W1, i.e., is smaller than the minimum W1min of the near-zero range W1 (step S15). In a case with NO in step S15, the first determination unit 41 may determine whether the instructed driving force Fd1 calculated in step S14 falls below the near-zero range W1, i.e., is smaller than the minimum W1min of the near-zero range W1, and whether the predicted driving force Fd2 falls beyond the near-zero range W1, i.e., is greater than the maximum W1max of the near-zero range W1 (step S16). In a case with YES in step S15 or S16, the near-zero range W1 is included between the instructed driving force Fd1 and the predicted driving force Fd2. Since the instructed driving force Fd1 and the predicted driving force Fd2 fall outside the near-zero range W1, it follows that the predicted driving force Fd2 overshoots the near-zero range W1, as viewed in the time-series order from the instructed driving force Fd1 to the predicted driving force Fd2.

As a result of the determination processes in steps S15 and S16, in a case where the predicted driving force Fd2 overshoots the near-zero range W1 (YES in step S15 or S16), the first determination unit 41 may set the first determination flag valid (step S17). In a case where the predicted driving force does not overshoot the near-zero range W1 (NO in steps S15 and S16), the first determination unit 41 may set the first determination flag invalid (step S18). The first determination flag is used to determine the rate-of-change control parameter in steps S3 to S7 on the second control cycle.

With the first determination flag and the second determination flag having been set, the requested driving force calculator 31 and the rate processor 32 may stand by until the second control cycle (step S19). Upon the second control cycle coming, the requested driving force calculator 31 and the rate processor 32 may execute the processing from step S1 again.

Description now moves on to operation examples provided by the forgoing calculation processing of the instructed driving force.

<Zero-Cross Control in First Example>

Figure 4:
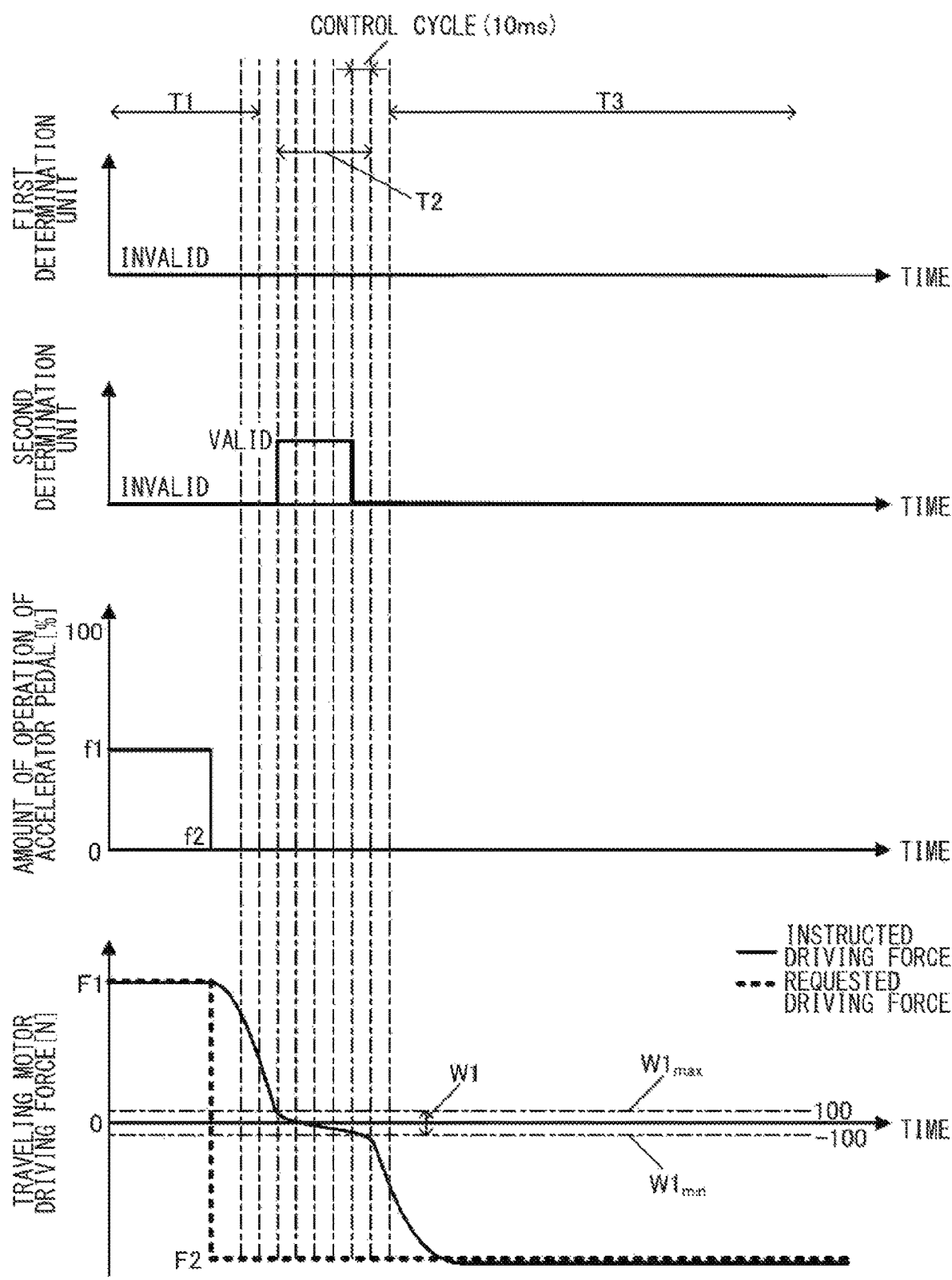
FIG. 4 is a time chart of a first example of a zero-cross control according to the embodiment.

FIG. 4 is a time chart of a first example of a zero-cross control according to the embodiment. The zero-cross control of the first example illustrates an operation example in which the impact is suppressed on the occasion that the driving force of the traveling motor 11 changes crossing over the zero driving force. In the time chart of FIG. 4, the characters "valid" and "invalid" of the first determination unit 41 indicate whether or not the first determination unit 41 has determined that the first condition is satisfied, and the characters "valid" and "invalid" of the second determination unit 42 indicate whether or not the second determination unit 42 has determined that the zero-cross condition is satisfied.

As illustrated in FIG. 4, the amount of operation of the accelerator pedal 21 changes from an amount of operation f1 of acceleration to an amount of operation f2 of deceleration, and thereupon, in response to the operation, the requested driving force changes from a positive value F1 to a negative value F2. In terms T1 and T3 when the instructed driving force is away from the near-zero range W1, in the rate processor 32, the zero-cross processor 40 does not act, while the normal rate processor 33 calculates the instructed driving force using the rate-of-change control parameter of the normal value. By the rate-of-change limitation control in these terms, the instructed driving force following the requested driving force is calculated while the abrupt change in the driving force is alleviated. Thereafter, the driving force corresponding to the instructed driving force calculated is outputted from the traveling motor 11 by the driving control by the driving controller 35. In the term T3, the traveling motor 11 is regenerative-driven in response to the negative instructed driving force, causing the negative driving force to be outputted from the traveling motor 11.

The operation example of FIG. 4 is an example in which on the occasion that the instructed driving force comes close to the near-zero range W1, the first determination unit 41 does not determine that the first condition is satisfied. That is, on the occasion that the instructed driving force comes close to the near-zero range W1, the second determination unit 42 determines that the zero-cross condition is satisfied, i.e., the instructed driving force on the current control cycle falls within the near-zero range W1. Thus, the zero-cross rate processor 43 may calculate the instructed driving force on the current control cycle, using the second value as the rate-of-change control parameter. The instructed driving force thus calculated may be sent to the driving controller 35, causing the instructed driving force to be outputted from the traveling motor 11.

Such rate-of-change limitation by the zero-cross rate processor 43 may be continued during a term T2 of the control cycle during which the zero-cross condition is satisfied. The term T2 may be a term from the control cycle when the instructed driving force enters the near-zero range W1 to the control cycle when the instructed driving force exits the near-zero range W1. By such rate-of-change limitation, the rate of change in the driving force is limited to a level at which the impact is suppressed, in a case with the driving force within the near-zero range W1. This leads to the suppression of the impact on the occasion that the traveling motor 11 switches from the powering operation to the regenerative operation.

<Zero-Cross Control in Second Example>

Figure 5:
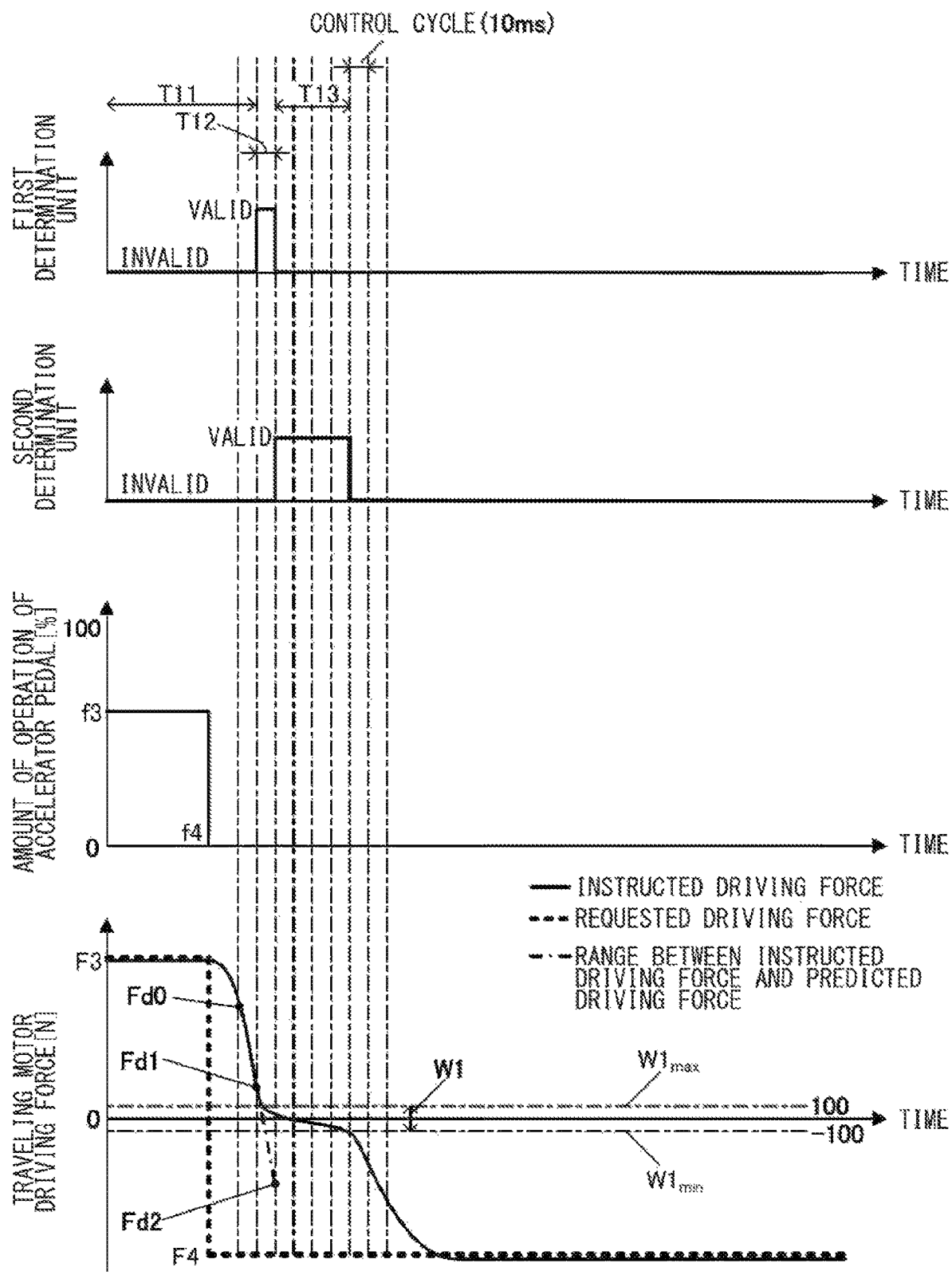
FIG. 5 is a time chart of a second example of the zero-cross control according to the embodiment.
Figure 6:
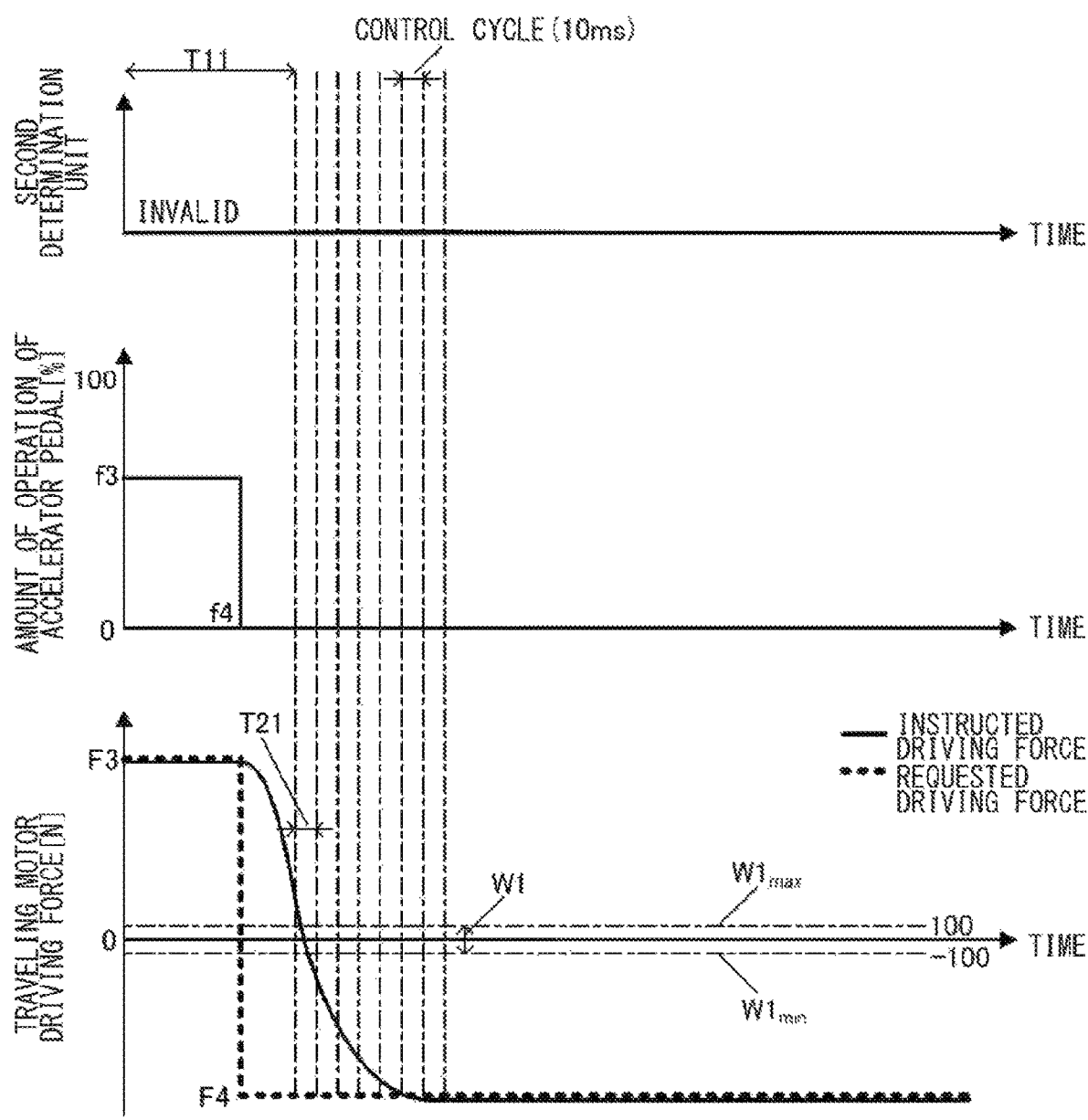
FIG. 6 is a time chart of an example of a zero-cross control according to a reference example.

FIG. 5 is a time chart of a second example of the zero-cross control according to the embodiment. FIG. 6 is a time chart of an example of a zero-cross control of a reference example. The reference example of FIG. 6 is an operation example of a driving force controller devoid of the control based on the determination of the first determination unit 41.

As illustrated in FIGS. 5 and 6, the amount of operation of the accelerator pedal 21 changes from an amount of operation f3 of acceleration to an amount of operation f4 of deceleration, and thereupon, in response to the operation, the requested driving force changes from a positive value F3 to a negative value F4. In a term T11 before the instructed driving force comes close to the near-zero range W1, the normal rate processor 33 calculates the instructed driving force following the requested driving force, using the rate-of-change control parameter of the normal value. Here, for example, in a case with a long term when a difference between the requested driving force and the instructed driving force is large, the rate of change in the instructed driving force becomes higher, even if the rate-of-change limitation is added. Furthermore, a case may occur where the instructed driving force calculated immediately before coming close to the near-zero range W1 becomes close to the near-zero range W1, e.g., 110 N. In such a case, if the normal rate processor 33 calculates the instructed driving force on the next control cycle as it is, the instructed driving force on the next control cycle would overshoot the near-zero range W1, as illustrated in a term T21 in FIG. 6.

Thus, as illustrated in the reference example of FIG. 6, in the configuration of the reference example devoid of the first determination unit 41, in the term T21, the second determination unit 42 does not determine that the zero-cross condition is satisfied. This causes a control failure in the control of limiting the rate-of-change control parameter of the instructed driving force to the second value in the near-zero range W1. In this case, the traveling motor 11 abruptly changes from the powering operation to the regenerative operation, resulting in occurrence of an impact.

In contrast, in the control of this embodiment, as illustrated in a control cycle T12 of FIG. 5, in a case where the predicted driving force Fd2 (FIG. 5) overshoots the near-zero range W1, the first determination unit 41 determines that the first condition is satisfied. The predicted driving force Fd2 assumes that the instructed driving force Fd1 on the current control cycle is changed at the rate of change at the time until the next control cycle. On the basis of the determination result, the zero-cross rate processor 43 may limit the rate of change in the instructed driving force to keep the instructed driving force on the next control cycle within the near-zero range W1. In this way, on the next control cycle, the instructed driving force is included in the near-zero range W1, and the second determination unit 42 determines that the zero-cross condition is satisfied. In a term T13 until the control cycle when the zero-cross condition is not satisfied, the zero-cross rate processor 43 calculates the instructed driving force, while changing the rate-of-change control parameter to the second value. This leads to the suppression of the impact on the occasion that the traveling motor 11 switches from the powering operation to the regenerative operation.

As described above, according to the vehicle 1 and the controller 30 of this embodiment, the first determination unit 41 determines whether the range between the instructed driving force on the current control cycle and the predicted driving force on the next control cycle at least partly covers the near-zero range W1. On the basis of the determination result of the first determination unit 41, the zero-cross rate processor 43 limits the rate of change in the instructed driving force, to impose the stronger limitation than, for example, the normal limitation on the rate of change in the instructed driving force. With such rate-of-change limitation, the instructed driving force on the next control cycle remains in the near-zero range W1, making it possible to reduce failures in detecting the control timing on the occasion that the instructed driving force changes crossing over the zero driving force. Hence, it is possible to appropriately suppress the impact on the occasion that the driving force of the traveling motor 11 changes crossing over the zero driving force.

Moreover, according to the vehicle 1 of this embodiment, the traveling motor 11 may serve as the power source that generates motive power for the driving wheels 2. This contributes to a small delay from the calculation of the instructed driving force to the actual output of the instructed driving force from the traveling motor 11. Accordingly, with the detection of the control timing for each control cycle described above, and the limitation on the rate of change in the instructed driving force based on the detection of the control timing, it is possible to suppress the impact occurring in the traveling motor 11 or on the transmission path of the motive power, on the occasion that the traveling motor 11 changes from the powering operation to the regenerative operation or vice versa.

Although some embodiments of the technology are described above by way of example with reference to the accompanying drawings, the technology is by no means limited to the embodiments described above.

In the foregoing embodiments, the example of the rate-of-change limitation is given in which in the case where the first determination unit 41 determines that the first condition is satisfied, the zero-cross rate processor 43 temporarily limits the rate of change, to keep the instructed driving force on the next control cycle within the near-zero range W1. However, this is non-limiting. In the case where the first determination unit 41 determines that the first condition is satisfied, the zero-cross rate processor 43 may limit, on and after the next control cycle, the rate-of-change control parameter to the second value that suppresses the impact, and calculate the instructed driving force.

Moreover, in the forgoing embodiments, the example is described in which the first condition for the determination by the first determination unit 41 may include that the range between the instructed driving force Fd1 on the current control cycle and the predicted driving force Fd2 on the next control cycle partly covers the near-zero range W1, and that the predicted driving force Fd2 overshoots the near-zero range W1. However, the condition that the predicted driving force Fd2 overshoots the near-zero range W1 may be eliminated from the first condition. That is, the first condition may include that the range between the instructed driving force Fd1 and the predicted driving force Fd2 partly covers the near-zero range W1. With such a configuration as well, as with the forgoing embodiments, it is possible to reduce the failures in detecting the control timing for the suppression of the impact, leading to the appropriate suppression of the impact on the occasion that the driving force of the traveling motor 11 changes crossing over the zero driving force.

Furthermore, in the forgoing embodiments, some specific examples are given, for example, the relation of the amount of operation of the driving operation unit and the requested driving force, the time length of the control cycle, and the near-zero range in which the rate-of-change limitation is imposed to suppress the impact. However, the details described in the forgoing embodiments may be otherwise modified as appropriate, without departing from the scope as defined by the appended claims.

According to the aspects of the disclosure, on the first control cycle, the first determination unit determines whether or not the range between the instructed driving force on the first control cycle and the predicted driving force on the second control cycle, i.e., the next control cycle, at least partly covers the first range including the zero driving force. In the case with the determination that the range partly covers the first range, the driving force calculator imposes the limitation on the rate of change in the instructed driving force to be calculated on the second control cycle. This makes it possible to detect the case where the rate of change in the instructed driving force is high, and the instructed driving force is expected to overshoot the first range during the single control cycle. Hence, it is possible to calculate the instructed driving force on the next control cycle while limiting the rate of change in the instructed driving force. With such limitation on the rate of change, it is possible to suppress the instructed driving force from overshooting the first range including the zero driving force during the single control cycle. Hence, it is possible to suppress a failure in the control of suppressing the impact on the occasion that the driving force changes crossing over the zero driving force.

The controller 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 30 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A driving force controller for a vehicle, the vehicle including a driving wheel and a power source configured to output a driving force to the driving wheel, the driving force controller for vehicle comprising:
 a driving force calculator configured to calculate an instructed driving force that varies on a basis of a driving command; and
 a driving controller configured to allow the power source to output, as the driving force, the instructed driving force calculated by the driving force calculator, wherein
 the driving force calculator includes a first determination unit configured to determine whether or not a predicted driving force satisfies a first condition, the predicted driving force is calculated according to the instructed driving force calculated on a first control cycle of the driving force of the power source being changed at a rate of change in the instructed driving force of the power source calculated on the first control cycle, until a second control cycle of the driving force of the power source following the first control cycle, the first condition comprises when a range, between the instructed driving force calculated on the first control cycle and the predicted driving force, at least partly cover a first range, the first range including at least a zero driving force at which the driving force is zero, the driving force calculator being configured to impose a limitation on the rate of change in the instructed driving force to be calculated on the second control cycle, when the first determination unit determines that the first condition is satisfied, and the driving force calculator is configured to calculate a single value of the instructed driving force on each of control cycles which include the first control cycle and the second control cycle, and output the single value of the instructed driving force to the driving controller.

2. The driving force controller for the vehicle according to claim 1, wherein when the first determination unit determines that the first condition is satisfied, the driving force calculator is configured to increase the limitation on the rate of change in the instructed driving force to be calculated on the second control cycle, to be greater than a limitation on the rate of change in the instructed driving force calculated on the first control cycle.

3. The driving force controller for the vehicle according to claim 2, wherein the driving force calculator further includes a second determination unit configured to determine whether or not a zero-cross condition is satisfied, the zero-cross condition indicating that the instructed driving force calculated by the driving force calculator is within the first range, on a condition that the second determination unit determines on the first control cycle that the zero-cross condition is satisfied, the driving force calculator is configured to limit the rate of change in the instructed driving force to be calculated on the second control cycle to a predetermined value or lower, and on a condition that the first determination unit determines on the first control cycle that the first condition is satisfied, the driving force calculator is configured to limit the rate of change in the instructed driving force to keep the instructed driving force to be calculated on the second control cycle within the first range.

4. The driving force controller for the vehicle according to claim 3, wherein the first condition is that the instructed driving force calculated on the first control cycle is greater than the first range and the predicted driving force is less than the first range, or that the instructed driving force calculated on the first control cycle is less than the first range and the predicted driving force is greater than the first range.

5. The driving force controller for the vehicle according to claim 4, wherein the power source comprises an electric motor.

6. The driving force controller for the vehicle according to claim 3, wherein the power source comprises an electric motor.

7. The driving force controller for the vehicle according to claim 2, wherein the first condition is that the instructed driving force calculated on the first control cycle is greater than the first range and the predicted driving force is less than the first range, or that the instructed driving force calculated on the first control cycle is less than the first range and the predicted driving force is greater than the first range.

8. The driving force controller for the vehicle according to claim 7, wherein the power source comprises an electric motor.

9. The driving force controller for the vehicle according to claim 2, wherein the power source comprises an electric motor.

10. The driving force controller for the vehicle according to claim 1, wherein the driving force calculator further includes a second determination unit configured to determine whether or not a zero-cross condition is satisfied, the zero-cross condition indicating that the instructed driving force calculated by the driving force calculator is within the first range, on a condition that the second determination unit determines on the first control cycle that the zero-cross condition is satisfied, the driving force calculator is configured to limit the rate of change in the instructed driving force to be calculated on the second control cycle to a predetermined value or lower, and on a condition that the first determination unit determines on the first control cycle that the first condition is satisfied, the driving force calculator is configured to limit the rate of change in the instructed driving force to keep the instructed driving force to be calculated on the second control cycle within the first range.

11. The driving force controller for the vehicle according to claim 10, wherein the first condition is that the instructed driving force calculated on the first control cycle is greater than the first range and the predicted driving force is less than the first range, or that the instructed driving force calculated on the first control cycle is less than the first range and the predicted driving force is greater than the first range.

12. The driving force controller for the vehicle according to claim 11, wherein the power source comprises an electric motor.

13. The driving force controller for the vehicle according to claim 10, wherein the power source comprises an electric motor.

14. The driving force controller for the vehicle according to claim 1, wherein the first condition is that the instructed driving force calculated on the first control cycle is greater than the first range and the predicted driving force is less than the first range, or that the instructed driving force calculated on the first control cycle is less than the first range and the predicted driving force is greater than the first range.

15. The driving force controller for the vehicle according to claim 14, wherein the power source comprises an electric motor.

16. The driving force controller for the vehicle according to claim 1, wherein the power source comprises an electric motor.

17. The driving force controller for the vehicle according to claim 1, wherein the driving force calculator comprises a drive force calculator circuitry, and a first determination unit comprises a first determination circuitry.

18. The driving force controller for the vehicle according to claim 1, wherein a processor is configured to provide the driving force calculator and the first determination unit.

19. The driving force controller for the vehicle according to claim 1, wherein the second control cycle of the driving force of the power source repeats a same set of steps of the first control cycle of the driving force of the power source.

20. A driving force controller for a vehicle, the vehicle including a driving wheel and a power source configured to output a driving force to the driving wheel, the driving force controller for the vehicle comprising circuitry configured to:

calculate an instructed driving force that varies on a basis of a driving command; and allow the power source to output, as the driving force, the instructed driving force, wherein the circuitry is configured to determine whether or not a predicted driving force satisfies a first condition, the predicted driving force is determined according to the instructed driving force calculated on a first control cycle of the driving force of the power source that is changed at a rate of change in the instructed driving force calculated on the first control cycle, until a second control cycle of the driving force of the power source following the first control cycle, the first condition comprises when a range, between the instructed driving force calculated on the first control cycle and the predicted driving force, at least partly cover a first range, the first range including at least a zero driving force at which the driving force is zero, and the circuitry being configured to impose limitation on the rate of change in the instructed driving force to be calculated on the second control cycle, when the circuitry determines that the first condition is satisfied, and the circuitry is configured to calculate a single value of the instructed driving force on each of control cycles which include the first control cycle and the second control cycle, and output the single value of the instructed driving force for outputting the driving force.

* * * * *